United States Patent
Filev et al.

(10) Patent No.: US 6,484,121 B1
(45) Date of Patent: Nov. 19, 2002

(54) SYSTEM FOR AUTOMATICALLY MEASURING PAINT FILM THICKNESS

(75) Inventors: Dimitar P. Filev, Novi, MI (US); Frank Migda, Commerce Township, MI (US); Gary Farquhar, Farmington Hills, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 65 days.

(21) Appl. No.: 09/657,210

(22) Filed: Sep. 7, 2000

(51) Int. Cl.$^7$ .............................................. G01B 17/02
(52) U.S. Cl. ........................... 702/170; 73/597; 73/598; 156/64; 118/668; 356/503; 382/108; 427/8
(58) Field of Search ................................ 702/155, 170, 702/171, 172; 356/410, 496, 503, 504; 382/108; 700/227, 244; 73/597, 598; 156/64; 118/668

(56) References Cited

U.S. PATENT DOCUMENTS

| | | | |
|---|---|---|---|
| 3,925,650 A | 12/1975 | Brown ........................ | 702/70 |
| 4,114,136 A | 9/1978 | D'Albora ..................... | 367/87 |
| 4,953,147 A | 8/1990 | Cobb .......................... | 367/35 |
| 4,977,853 A | 12/1990 | Falcoff et al. ............... | 118/665 |
| 5,043,927 A | 8/1991 | Jackson ........................ | 702/66 |
| 5,062,298 A * | 11/1991 | Falcoff et al. ................. | 73/597 |
| 5,142,648 A * | 8/1992 | Fitts et al. .................... | 382/108 |
| 5,175,018 A * | 12/1992 | Lee et al. ....................... | 427/8 |
| 5,356,334 A | 10/1994 | Gray ........................... | 118/665 |
| 5,448,503 A | 9/1995 | Morris et al. ................. | 702/66 |
| 5,504,695 A * | 4/1996 | Yoshida et al. .............. | 702/170 |
| 5,634,975 A | 6/1997 | Josefsson ..................... | 118/326 |
| 5,847,963 A | 12/1998 | Gaiski ......................... | 700/244 |
| 5,959,211 A | 9/1999 | Wagner et al. ................ | 73/634 |
| 5,974,886 A * | 11/1999 | Carroll et al. ................ | 73/598 |
| 6,001,198 A * | 12/1999 | Habisreitinger et al. ....... | 156/64 |
| 6,067,509 A | 5/2000 | Gaiski ......................... | 702/170 |
| 6,071,346 A * | 6/2000 | Yamauchi et al. ........... | 118/668 |
| 6,128,081 A * | 10/2000 | White et al. ................. | 356/503 |
| 6,226,568 B1 * | 5/2001 | Tong et al. .................. | 700/277 |

FOREIGN PATENT DOCUMENTS

WO             92/19933         11/1992   .................. 73/597

* cited by examiner

Primary Examiner—John S. Hilten
Assistant Examiner—John Le
(74) Attorney, Agent, or Firm—Damian Porcari

(57) ABSTRACT

A system is provided for automatically measuring paint film thickness of painted bodies for closed loop control of a paint process for painting the bodies in a paint booth. The system includes a cell for receiving painted bodies from the paint booth and a conveyor control system for controlling the movement of painted bodies between the paint booth and the cell. The system also includes an AutoPelt system communicating with the conveyor control system for measuring paint film thickness of the painted bodies in the cells. The system includes an integrated paint quality control (IPQC) monitoring system communicating with the AutoPelt system for receiving data of paint film thickness information and combining the paint film thickness information with automation parameters on a vehicle identification number (VIN) basis of the painted bodies to control paint automation equipment of the paint booth.

18 Claims, 4 Drawing Sheets

SYSTEM FOR AUTOMATICALLY MEASURING PAINT FILM THICKNESS

BACKGROUND OF THE INVENTION

1. Field of the Invention

The present invention relates generally to paint film thickness of painted bodies and, more specifically, to a system for automatically measuring paint film thickness of painted bodies.

2. Description of the Related Art

The application of paint to a body of a vehicle is a sensitive process. The quality, durability, and color matching of the paint are critical in producing a high quality product, and therefore require significant quality control efforts. Generally, paint film thickness is monitored by use of hand-held sensors, such as an ultrasonic pulse echo layer thickness (PELT) meter or a magnetic induction meter. These sensors are handled by an operator who must manually apply the sensor against a surface of the body of the vehicle in a position normal to the surface at a plurality of locations on the surface. In the performance of this measurement, it is highly important that the operator position the sensor normal to the particular location being sensed, and it is also critical that the operator position the sensor consistently at the same locations on the surface being sensed. Errors in the angle of the sensor relative to the surface or in the location of the sensor on the surface can adversely affect quality control. Presently, readings are taken manually by an operator, which is time consuming and does not provide sufficient information or sample size to control the paint process. Because a significant reliance is placed upon the operator, a significant amount of error is introduced in the quality control of the paint process.

It is also known to provide a method and apparatus for positioning sensors against a non-planar surface for sensing paint film thickness. An example of such a method and apparatus is disclosed in U.S. Pat. No. 5,959,211 to Wagner et al., the disclosure of which is hereby incorporated by reference. In this patent, the apparatus includes a movable fixture and a plurality of pistons carried by the movable fixture. Each of the pistons is movable independently with respect to the fixture. Each piston includes a distal end and a sensor pivotally mounted to each distal end. Each distal end is spring-biased away from the fixture. Each sensor includes at least two contact points for contacting the non-planar surface on opposing sides of the respective location for orienting the sensor in a position normal to the non-planar surface at the respective location. However, the film thickness is only measured on two vehicle bodies per day and the paint process cannot be controlled with this data.

As a result, it is desirable to provide a system for automatically measuring paint film thickness of painted bodies for closed loop control of the paint process. It is also desirable to provide a system to measure multiple layers of paint film automatically to control the paint process for each layer, which will result in closed loop control of the paint process. It is further desirable to automatically control the paint process to improve paint quality, reduce material costs, and provide a better surface appearance.

SUMMARY OF THE INVENTION

Accordingly, the present invention is a system for automatically measuring paint film thickness of painted bodies for closed loop control of a paint process. The system includes a cell for receiving painted bodies from the paint booth and a conveyor control system for controlling the movement of painted bodies between the paint booth and the cell. The system also includes an AutoPelt system communicating with the conveyor control system for measuring paint film thickness of the painted bodies in the cells. The system includes an integrated paint quality control (IPQC) monitoring system communicating with the AutoPelt system for receiving data of paint film thickness information and combining the paint film thickness information with automation parameters on a vehicle identification number (VIN) basis of the painted bodies to control paint automation equipment of the paint booth.

One advantage of the present invention is that a system for automatically measuring paint film thickness of painted bodies is provided for closed loop control of the paint process. Another advantage of the present invention is that the system automatically measures paint film thickness, which is used as feedback information to control the paint process. Yet another advantage of the present invention is that the system automatically controls the paint process significantly, improving paint quality, reducing material costs, and providing a better surface appearance on the painted body of the vehicle.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
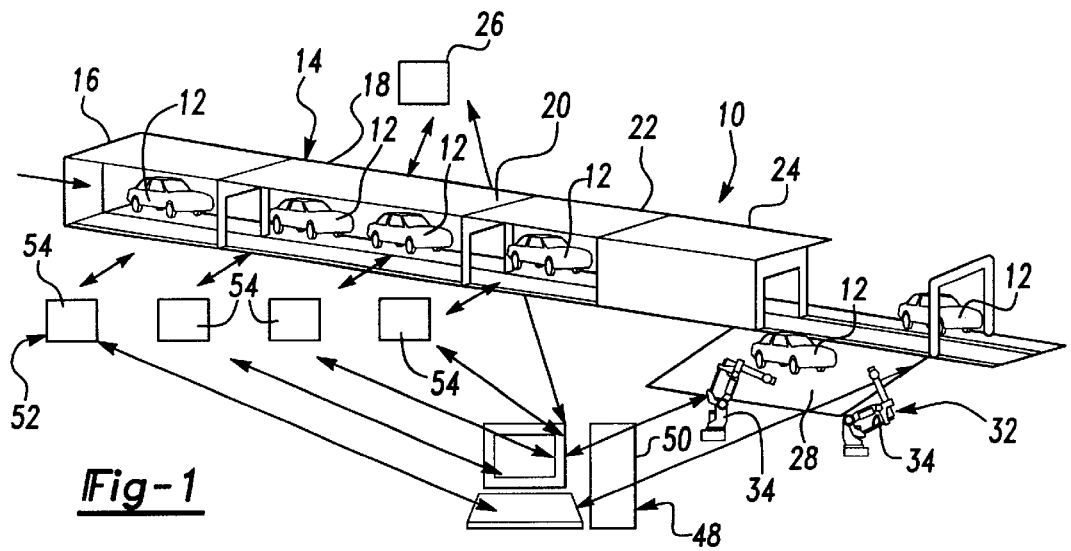
FIG. 1 is a diagrammatic view of a system for automatically measuring paint film thickness of painted bodies, according to the present invention.
Figure 2:
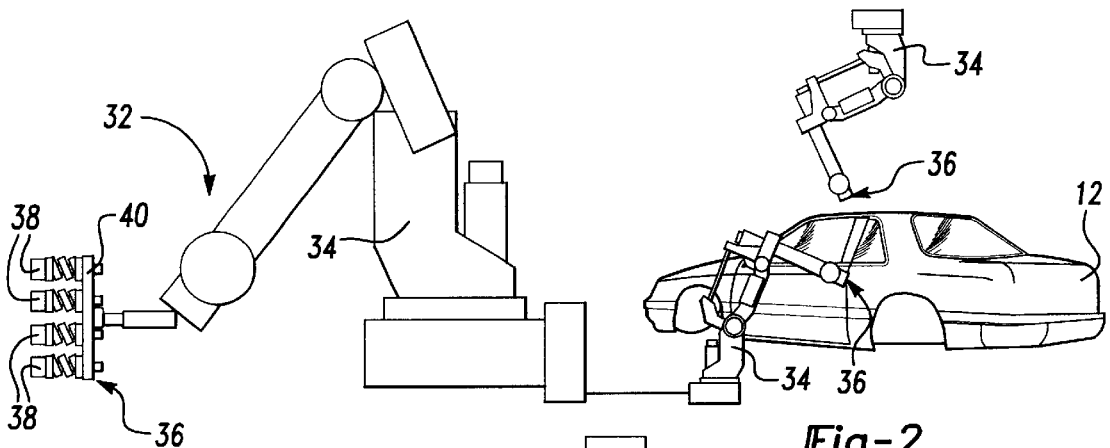
FIG. 2 is a diagrammatic view of a portion of the system of FIG. 1.

Referring to the drawings and in particular FIG. 1, one embodiment of a system 10, according to the present invention, for automatically measuring paint film thickness of painted bodies 12 is shown. The painted bodies 12 are vehicle bodies for motor vehicles (not shown). The system 10 measures film thickness on a surface of the painted bodies 12 automatically to feedback information for controlling the paint process for the vehicle bodies. The system 10 measures multiple layers of paint film automatically on the painted bodies to control the paint process for each layer of the painted bodies 12.

Figure 5:
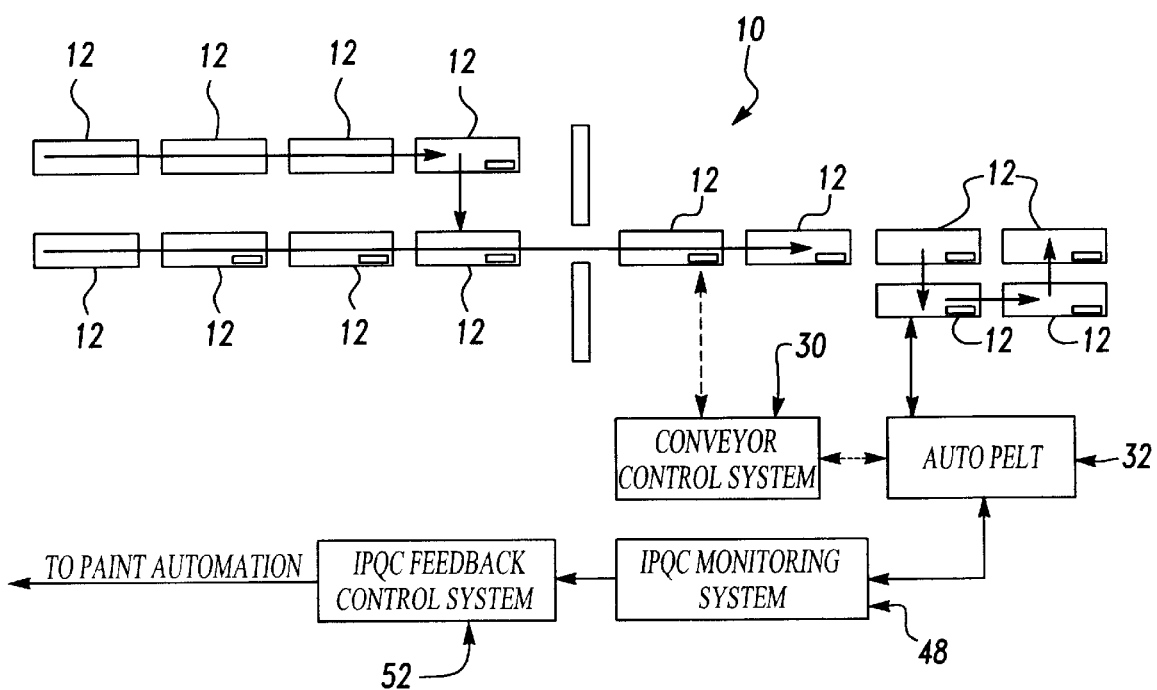
FIG. 5 is a block diagram of the system of FIG. 1.

Referring to FIGS. 1 and 5, the system 10 includes a paint booth, generally indicated at 14. The paint booth 14 includes a plurality of zones 16,18,20,22,24. The paint booth 14 includes a base coat (B/C) bells zone 16 and a base coat reciprocation (B/C Recips) zone 18 adjacent the B/C bells zone 16. The paint booth 14 also includes a first clear coat (C/C) bells zone 20 adjacent the B/C Recips zone 18 and a second C/C bells zone 22 adjacent the first C/C bells zone 20. The paint booth 14 includes an oven zone 24 adjacent the second C/C bells zone 22. The paint booth 14 includes an airflow control 26 such as fans and dampers to control the airflow in the zones 16,18,20,22,24. It should be appreciated that the paint booth 14 is conventional and known in the art.

The system 10 includes a conveyor station or measurement cell 28 located adjacent to the end of the oven zone 24 of the paint booth 14 for automatically measuring paint film thickness on the painted vehicle bodies 12. The system 10 includes a conveyor control system 30 having a conveyor (not shown) for moving the painted bodies 12 off-line to and from the cell 28 and a conveyor (not shown) of the paint booth 14.

Referring to FIGS. 1 through 5, the system 10 also includes an AutoPelt system 32 for measuring paint film thickness on the vehicle bodies 12 off-line in the cell 28. The AutoPelt system 32 includes at least one, preferably a plurality of robots 34 and a multiple sensor tool 36 attached to each of the robots 34. The sensor tool 36 includes at least one, preferably a plurality of ultrasonic pulse echo layer thickness (PELT) sensors 38 and a sensor alignment fixture 40 that positions the PELT sensors 38 to the painted bodies 12. The sensor tool 36 on the robots 34 aligns the PELT sensors 38 to specific coordinates on each body panel of the painted bodies 12 that are aligned with vertical and horizontal paint applicators (not shown) in the paint booth 14 that apply paint on the bodies of the vehicles. An example of such a sensor tool 36 is disclosed in U.S. Pat. No. 5,959,211 to Wagner et al., the disclosure of which is hereby incorporated by reference.

Figure 3:
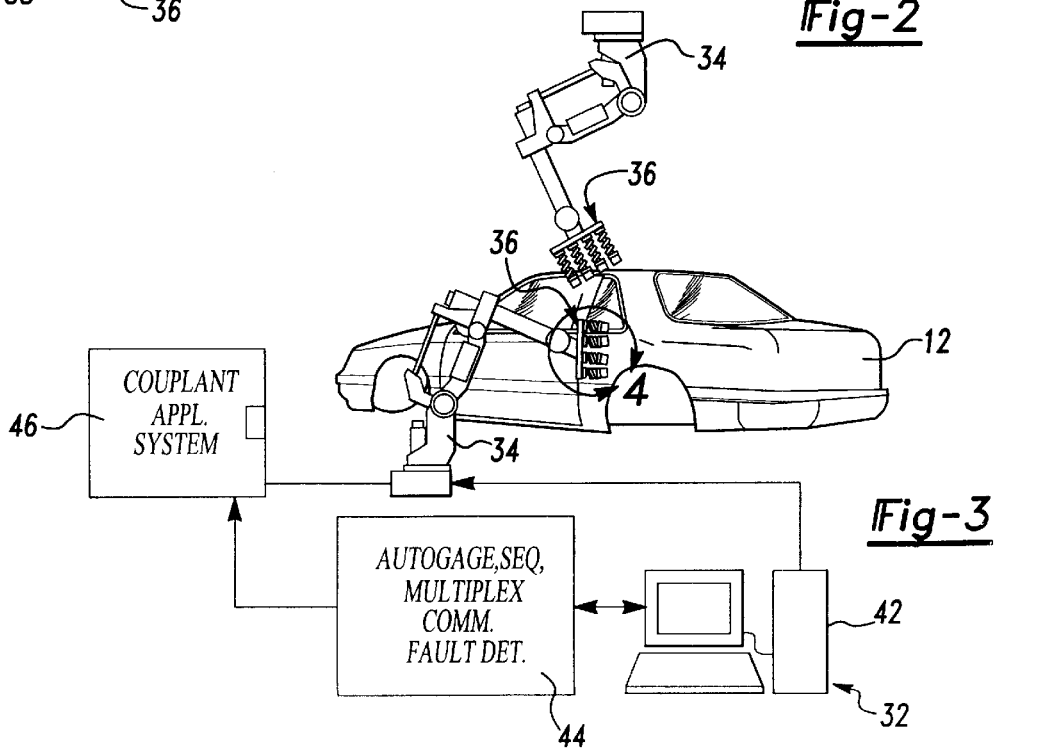
FIG. 3 is a diagrammatic view of another portion of the system of FIG. 1.
Figure 4:
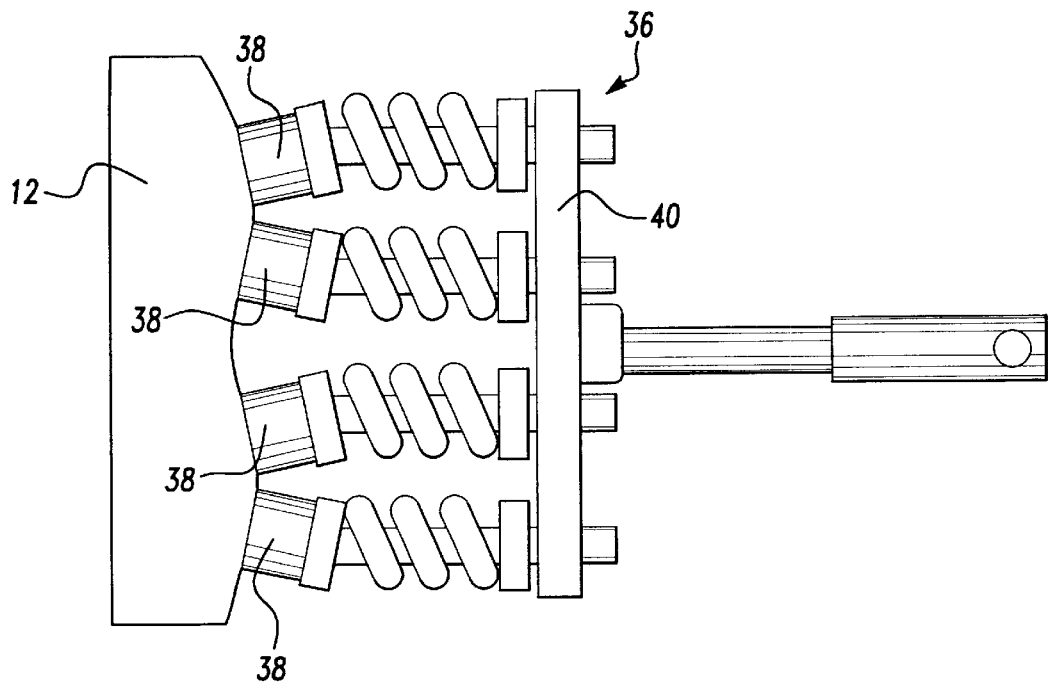
FIG. 4 is an enlarged view of the system in circle 4 of FIG. 3.

Referring to FIG. 3, the AutoPelt system 32 also includes a computer system 42, which includes a computer having a memory, a processor, a display, and user input mechanism, such as a mouse or keyboard, connected to the robots 34. The AutoPelt system 32 includes sensor controls 44 such as controllers (not shown) equipped with automatic sequencing/stability software connected to the computer system 42. The sensor controls 44 also include multiplex communication and fault detection. The AutoPelt system 32 further includes a liquid coupling application system 46 such as robots 34 and controllers (not shown) connected to the sensor controls 44 to control the movement of the sensor alignment fixture 40 over the painted body 12 and for ultrasonic measurement. It should be appreciated that the AutoPelt system 32 communicates with the conveyor control system 30 to coordinate the movement of painted bodies to and from the cell 28.

Referring to FIGS. 1 and 5, the system 10 includes an integrated paint quality control (IPQC) monitoring system 48 connected to the AutoPelt system 32, which receives paint film thickness information from the AutoPelt system 32 and combines the paint film thickness information with automation parameters on a vehicle identification number (VIN) basis. The IPQC monitoring system 48 includes a computer system 50, which includes a computer having a memory, a processor, a display, and user input mechanism, such as a mouse or keyboard. The IPQC monitoring system 48 collects all inputs such as applicator flow rates, shaping air, high voltage, bell speed, and outputs information such as film thickness distribution over the vehicle body, for each painted body 12 that is measured.

The system 10 further includes an integrated paint quality control (IPQC) feedback control system 52 such as a programmable logic controller (PLC) 54, connected to the IPQC monitoring system 48, which receives the output information from the IPQC monitoring system 48. The IPQC feedback control system 44 outputs to and controls paint automation equipment such as the paint applicators, airflow control, etc., of the paint booth 14. It should be appreciated that there is a significant time difference between the actual paint application and the film thickness measurement. It should also be appreciated that, since the film thickness measurement is processed off-line in the cell 28, not all painted bodies 12 are measured by the AutoPelt system 32 and the decision for selection of a painted body 12 to be measured is made by the control system 30. It should further be appreciated that the control system 30 reads the VIN of the painted body 12 and communicates with the IPQC monitoring system 48.

In general, a painted body 12 enters the cell 28 and the fixture 40 is placed on desired coordinates of the painted body 12. The computer system 42 of the AutoPelt system 32 communicates with the software of the sensor controls 44 until all designated areas are measured. The film thickness measurement information is then sent back to the computer system 50 of the IPQC monitoring system 48 to adjust the paint application parameters. The painted body 12 is then released back onto the moving conveyor of the paint booth 14. It should be appreciated that the number and location of the measurements will depend on the size of the painted body 12 and the paint application process.

The system 10 operates in three (3) modes of operation as follows:

Auto Mode

For the auto mode, the AutoPelt system 32 automatically supplies film thickness information to the IPQC monitoring system 48. The auto mode prioritizes painted bodies 12 in order to insure that all of the body style, option, color, and booth attributes are uniformly sampled through out the time period such as a day. It should be appreciated that the system 10 tries and avoid painted bodies 12 that had not been processed correctly in the paint booth 14 (i.e. to avoid automation faults).

During the initial setup of the system 10, the operator of the cell control system 30 sets up the number of colors, styles, options, etc., that are in the standard paint process of the paint booth 14. The cell control system 30 builds a matrix based on the total number of combinations that are available. The size of this matrix is based on the current number of options. For example, the standard paint process has the potential for 6 body styles, 24 colors, two booths, and seven options, which would be the maximum size of the matrix. The matrix below shows an example of a standard paint process with two body styles and three colors.

|  | Red | White | Blue |
|---|---|---|---|
| Wagon | 0 | 0 | 0 |
| Sedan | 0 | 0 | 0 |

During the paint process in the paint booth 14, the applicators will send a fault status to the IPQC monitoring system 48 with each of the painted bodies 12 of the vehicles it process. A list of "faulty" VIN numbers is passed from the IPQC monitoring system 48 on to the cell control system 30. As previously described, there is a long delay between the time the body of the vehicle is painted and the time the painted body 12 reaches the AutoPelt system 32 so timing is not a critical issue.

Figure 6:
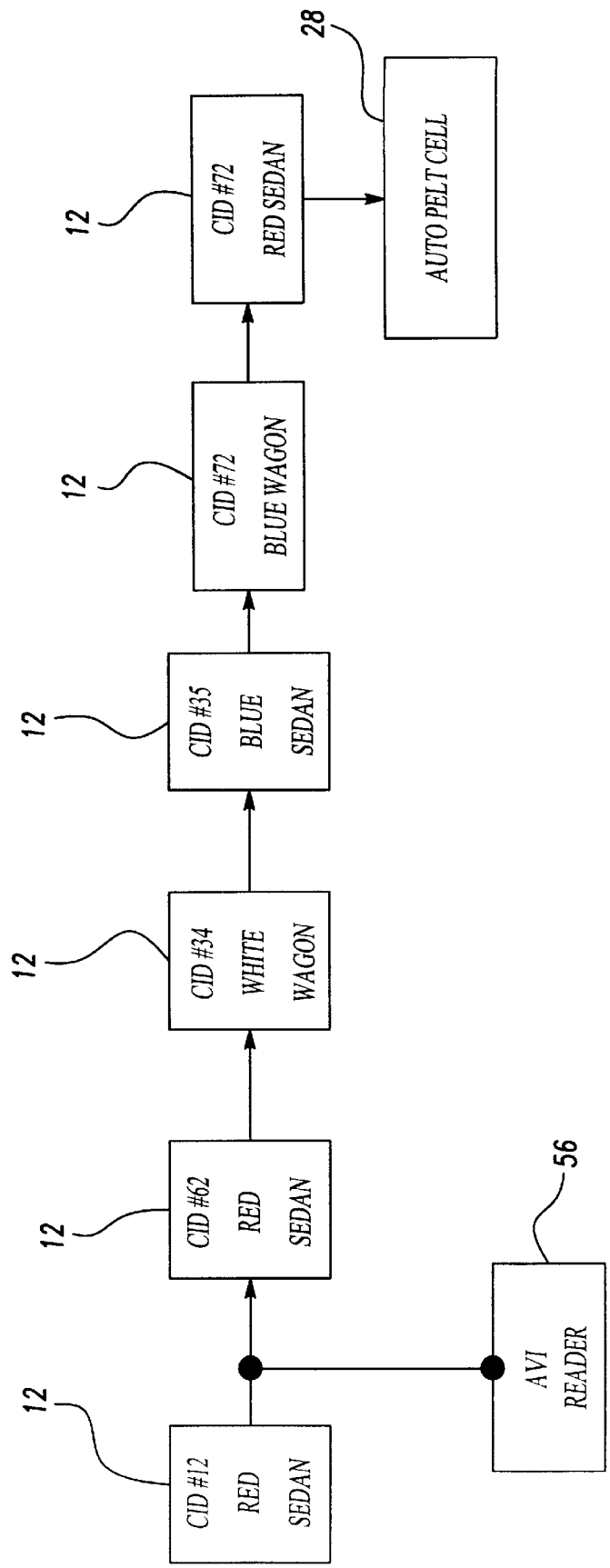
FIG. 6 is a block diagram of a sample queue of the system of FIG. 1.

Referring to FIG. 6, painted bodies 12 passing an automatic vehicle identification (AVI) reader 56 of the cell control system 30 will start building a queue such as a sample queue below:

|  | Position 5 | Position 4 | Position 3 | Position 2 | Position 1 |
|---|---|---|---|---|---|
| CID # | 62 | 34 | 35 | 72 | 81 |
| Color | Red | White | Blue | Blue | Red |
| Style | Sedan | Wagon | Sedan | Wagon | Sedan |

When painted bodies 12 reach the entrance to the cell 28, the following information is considered before accepting the painted body 12 into the cell 28.

1. Is the cell 28 empty or have a completed painted body 12 ready to be put back into the system 10?
2. Is the painted body 12 in position #1 not on the list of "faulty"?
3. Have all of the types of painted bodies 12 in the present queue which are not "bad" been sampled?

If the answer to all questions is yes and the system 10 is in auto or semi auto mode, the painted body 12 is sent into the cell 28. If the answer is no to any of the questions, the control system 30 will check all of the painted bodies 12 in the queue and wait for the painted body 12 that meets the above criteria. If there are not any painted bodies 12 in the queue that meet all of the requirements, the cell control system 30 accepts the unit in position one.

The process continues in this manner updating the sample matrix with a 1 in the cell 28 of the type of painted body 12 that has just been processed. After the painted body 12 is processed, all of the film build data is sent back to the IPQC monitoring system 48. When all of the painted bodies 12 are processed, the matrix is reset to all zeros.

Semi Auto Mode

The Semi Auto mode of operation is similar to auto mode with the exception that the system 10 is now trying to supply the IPQC monitoring system 48 with painted bodies 12 having attributes defined by the user. (Example: painted bodies processed in Booth #1 would take priority). This would allow the user to compromise uniform selection with prioritizing some of vehicle group of painted bodies 12.

When in semi auto mode, the system 10 operates as it does in the auto mode. The difference is that the system 10 pre-initializes the "sample matrix" based on the operator's request. In the following example, the operator has requested to look at Red units:

|  | Red | White | Blue |
|---|---|---|---|
| Wagon | 0 | 1 | 1 |
| Sedan | 0 | 1 | 1 |

Manual Mode

Manual Mode allows the user to activate a switch (not shown) that would send the next available painted body 12 into the cell 28. This painted body 12 would be processed and the data sent to the IPQC monitoring system 48.

Figure 7:
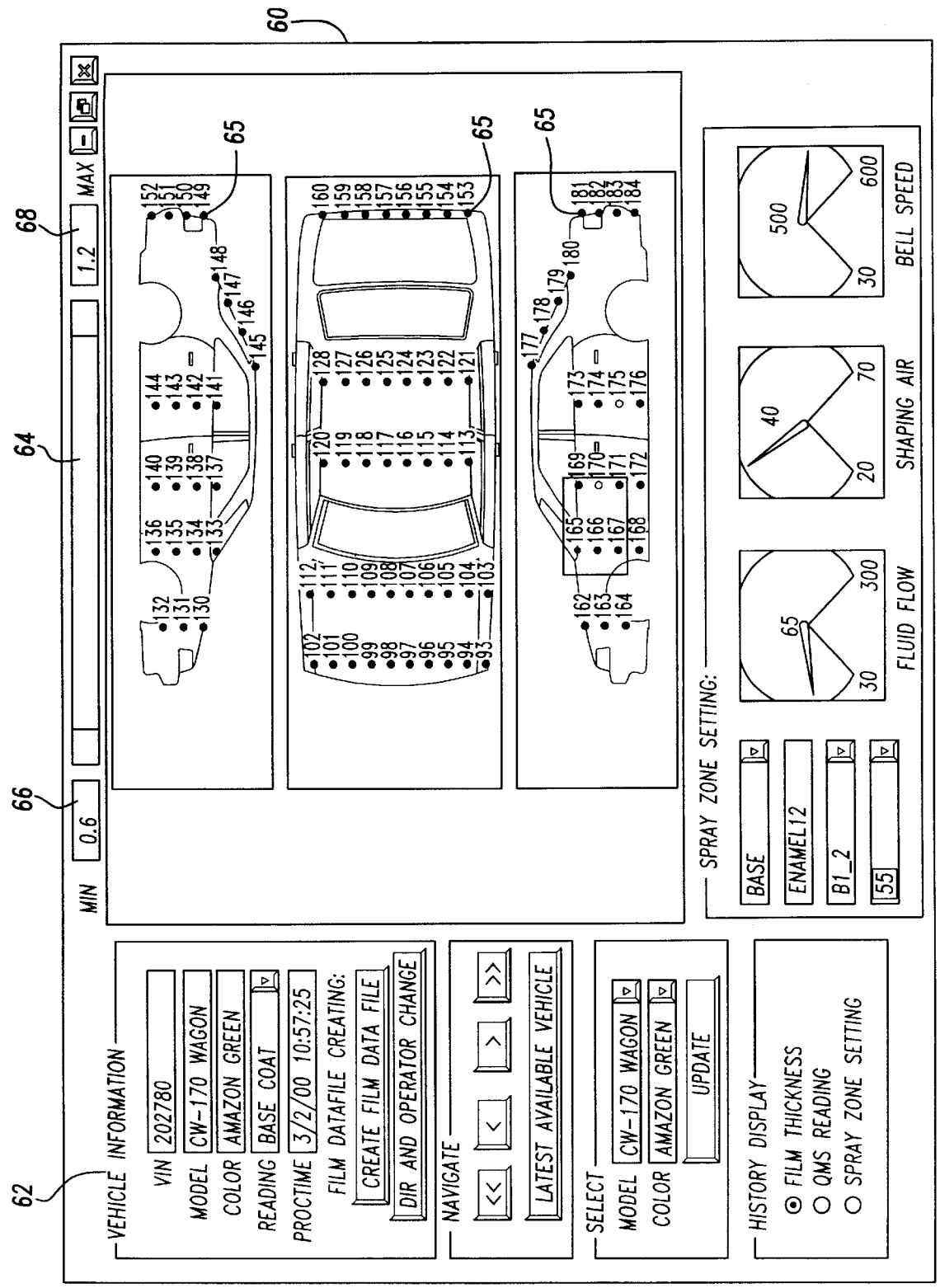
FIG. 7 is a diagrammatic view of a film thickness and paint booth visualization interface of the system of FIG. 1.

In operation, measurements taken by the AutoPelt system 32 are displayed by the IPQC monitoring system 48. A major component of the IPQC monitoring system 48 is a Graphical Film Thickness and Paint Booth Visualization Interface 60 illustrated in FIG. 7. The interface 60 is a convenient tool for the analysis of the vehicle paint process. The interface 60 can be used to graphically display film thickness values and their measurement locations on the vehicle layout image. The interface 60 also can be used to display the paint booth automation parameters (applicators flow rates, shaping air, bell speed, and high voltage) related to those measurement locations. The relation between the vehicle paint quality and the paint booth operating setting is graphically created through querying the database of the IPQC monitoring system 48.

In operation, the interface 60 automatically uploads the information of the last painted body 12 with the film thickness measurement ready. The painted body's VIN number, Model, Color, reading type, and processing time are displayed in a "vehicle information" group box 62. In the top of the layout image, there is a color bar 64. The color of the circles 65 in the layout image not only depends on the measurement value, but also depends on the display range that is set by two edit boxes "MIN" 66 and "MAX" 68. If the value is below the minimum, the color is cyan. If the value is above the maximum, the color is yellow. Otherwise, the color of the circles 65 changes gradually from dark green to light green depending on the value.

The interface 60 also provides information of the film thickness history. The interface 60 can display the data series from current painted body 12 to 10 previous painted bodies 12 in charts. This information can be combined with the history of the automation parameters. This information is used for analyzing the relationship between the input/output data and for manual control of the paint booth 14.

Accordingly, the system 10 targets dry film build measurement at designated areas on the painted body 12 of the vehicle common to the paint applicators of the paint booth 14. The system 10 provides increased first run capability, reduced material usage, and improved paint quality of the painted bodies (12). The system 10 eliminates the need for an operator and enables a "lights out" paint booth strategy. The film thickness information is automatically fed back to the application and automation equipment to control the paint process, thereby further eliminating several operators that presently control the paint process manually. The system 10 measures the film thickness of all paint layers at the specified locations.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A system for automatically measuring paint film thickness of painted bodies for closed loop control of a paint process for painting the bodies in a paint booth, said system comprising:
   a cell for receiving painted bodies from the paint booth;
   a conveyor control system for controlling the movement of painted bodies between the paint booth and the cell;
   an AutoPelt system communicating with the conveyor control system for measuring paint film thickness of the painted bodies in the cells; and
   an integrated paint quality control (IPQC) monitoring system communicating with said AutoPelt system for receiving data of paint film thickness information and combining the paint film thickness information with automation parameters on a vehicle identification number (VIN) basis of the painted bodies to control paint automation equipment of the paint booth.

2. A system as set forth in claim 1 wherein said IPQC monitoring system comprises a computer system including a computer having a memory, a processor, a display, and user input mechanism.

3. A system as set forth in claim 1 wherein said conveyor control system includes a vehicle identification reader for reading the VIN of the painted bodies.

4. A system as set forth in claim 1 wherein said AutoPelt system includes at least one robot and a multiple sensor tool attached to said at least one robot.

5. A system as set forth in claim 4 wherein said sensor tool includes at least one ultrasonic pulse echo layer thickness (PELT) sensor.

6. A system as set forth in claim 4 wherein said sensor tool includes a sensor alignment fixture for positioning said at least one sensor to the painted bodies.

7. A system as set forth in claim 4 wherein said AutoPelt system includes sensor controls connected to said sensor tool to control said at least one sensor.

8. A system as set forth in claim 4 wherein said AutoPelt system includes a liquid coupling application system connected to said sensor controls to control movement of said sensor alignment fixture over the painted bodies.

9. A system for automatically measuring paint film thickness of painted bodies for closed loop control of a paint process for painting the bodies in a paint booth, said system comprising:

a cell for receiving painted bodies from the paint booth;

a conveyor control system for controlling the movement of painted bodies between the paint booth and the cell and including a vehicle identification reader for reading a vehicle identification number (VIN) of the painted bodies;

an AutoPelt system communicating with the conveyor control system for measuring paint film thickness of the painted bodies in the cells; and an integrated paint quality control (IPQC) monitoring system communicating with said AutoPelt system for receiving data of paint film thickness information and combining the paint film thickness information with automation parameters on the vehicle identification number (VIN) basis of the painted bodies to control paint automation equipment of the paint booth.

10. A system as set forth in claim 9 wherein said IPQC monitoring system comprises a computer system including a computer having a memory, a processor, a display, and user input mechanism.

11. A system as set forth in claim 9 wherein said AutoPelt system includes at least one robot and a multiple sensor tool attached to said at least one robot.

12. A system as set forth in claim 11 wherein said sensor tool includes a sensor alignment fixture for positioning said at least one sensor to the painted bodies.

13. A system as set forth in claim 11 wherein said AutoPelt system includes sensor controls connected to said sensor tool to control said at least one sensor.

14. A system as set forth in claim 11 wherein said AutoPelt system includes a liquid coupling application system connected to said sensor controls to control movement of said sensor alignment fixture over the painted bodies.

15. A system as set forth in claim 11 wherein said sensor tool includes at least one ultrasonic pulse echo layer thickness (PELT) sensor.

16. A system for automatically measuring paint film thickness of painted bodies for closed loop control of a paint process for painting the bodies in a paint booth, said system comprising:

a cell for receiving painted bodies from the paint booth;

a conveyor control system for controlling the movement of painted bodies between the paint booth and the cell and including a vehicle identification reader for reading a vehicle identification number (VIN) of the painted bodies;

an AutoPelt system communicating with the conveyor control system for measuring paint film thickness of the painted bodies in the cells and includes at least one robot and a multiple sensor tool attached to said at least one robot, said sensor tool including at least one ultrasonic pulse echo layer thickness (PELT) sensor and a sensor alignment fixture for positioning said at least one sensor to the painted bodies; and an integrated paint quality control (IPQC) monitoring system communicating with said AutoPelt system for receiving data of paint film thickness information and combining the paint film thickness information with automation parameters on the vehicle identification number (VIN) basis of the painted bodies and to control paint automation equipment of the paint booth.

17. A system as set forth in claim 16 wherein said AutoPelt system includes sensor controls connected to said sensor tool to control said at least one sensor.

18. A system as set forth in claim 16 wherein said AutoPelt system includes a liquid coupling application system connected to said sensor controls to control movement of said sensor alignment fixture over the painted bodies.

* * * * *